United States Patent
Zhao

(10) Patent No.: US 9,098,145 B2
(45) Date of Patent: Aug. 4, 2015

(54) TOUCH-SCREEN LIQUID CRYSTAL DISPLAY WITH COOPERATING PHOTOSENSITIVE TFT AND CAPACITOR FOR TOUCH

(71) Applicant: BOE TECHNOLOGY GROUP CO., LTD., Beijing (CN)

(72) Inventor: Jiayang Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 111 days.

(21) Appl. No.: 13/805,034

(22) PCT Filed: Nov. 15, 2012

(86) PCT No.: PCT/CN2012/084687
§ 371 (c)(1),
(2) Date: Dec. 18, 2012

(87) PCT Pub. No.: WO2013/071875
PCT Pub. Date: May 23, 2013

(65) Prior Publication Data
US 2013/0127766 A1 May 23, 2013

(30) Foreign Application Priority Data
Nov. 18, 2011 (CN) .................... 2011 2 0462287 U

(51) Int. Cl.
*G06F 3/044* (2006.01)
*G06F 3/042* (2006.01)
*G06F 3/041* (2006.01)

(52) U.S. Cl.
CPC ............. *G06F 3/0421* (2013.01); *G06F 3/044* (2013.01); *G06F 3/0412* (2013.01); *G06F 2203/04106* (2013.01)

(58) Field of Classification Search
CPC ....... G06F 3/041; G06F 3/0412; G06F 3/042; G06F 3/0421; G06F 3/044; G06F 2203/04106; G06F 2001/13312; H03K 17/96; H03K 17/962; H03K 17/9627; H03K 17/9631; H03K 17/962; H03K 17/9627; H03K 17/9631; G09G 2360/14–2630/142
USPC ............................ 349/12; 345/173–178, 207; 178/18.01–18.11
See application file for complete search history.

(56) References Cited

U.S. PATENT DOCUMENTS

| | | | |
|---|---|---|---|
| 7,999,796 B2* | 8/2011 | Lee et al. ....................... | 345/174 |
| 2006/0077186 A1* | 4/2006 | Park et al. ..................... | 345/173 |

(Continued)

FOREIGN PATENT DOCUMENTS

| CN | 101101525 A | 1/2008 |
|---|---|---|
| CN | 101751170 A | 6/2010 |

(Continued)

OTHER PUBLICATIONS

International Search Report; dated Nov. 18, 2011; PCT/CN2012/084687.

(Continued)

*Primary Examiner* — Liliana Cerullo
(74) *Attorney, Agent, or Firm* — Ladas & Parry LLP

(57) ABSTRACT

The present disclosure discloses a touch-screen liquid crystal display, comprising: an array substrate, a counter substrate provided opposite to the array substrate, spacers and liquid crystal between the array substrate and the counter substrate, an induction read-out circuit and a scanning circuit; the counter substrate is provided thereon with an upper electrode plate, and the array substrate is provided thereon with a lower electrode plate; the upper electrode plate and the lower electrode plate form an induction capacitor; the array substrate comprises a touch unit provided within a pixel region; the drain electrode of the photosensitive TFT is connected to the lower electrode plate, and the drain electrode of the photosensitive TFT is also connected to the scanning circuit; and an output-signal line of the touch unit is connected to the induction read-out circuit.

8 Claims, 2 Drawing Sheets

(56) References Cited

U.S. PATENT DOCUMENTS

2010/0156847 A1* 6/2010 No et al. .................... 345/175
2012/0112047 A1* 5/2012 Brown et al. ............. 250/214.1

FOREIGN PATENT DOCUMENTS

| CN | 102200872 A | 9/2011 |
| CN | 202351848 U | 7/2012 |
| WO | 2010/021981 A1 | 2/2010 |

OTHER PUBLICATIONS

International Preliminary Report on Patentability dated May 20, 2014; PCT/CN2012/084687.

* cited by examiner

TOUCH-SCREEN LIQUID CRYSTAL DISPLAY WITH COOPERATING PHOTOSENSITIVE TFT AND CAPACITOR FOR TOUCH

TECHNICAL FIELD

Embodiments of the disclosure relate to a hybrid in-cell touch-screen liquid crystal display.

BACKGROUND

In contrast to an on-cell touch technology, an in-cell touch technology refers to the technology of forming elements used for realizing touch-panel functions within liquid crystal pixels. The in-cell touch-screen, with advantages of high light-transmittance and high resistance to damages, becomes an important development direction for touch-screens in future. The existing in-cell touch technology has generally two types: capacitive type and photosensition type.

A common capacitive or photosension touch-screen has disadvantages of reduced sensitivity and complexity in algorithms because its structure has requirements on touch pressure and light intensity. The operating principle of a capacitive touch-screen is that: because a finger press causes change in distance between the electrode plates of a capacitor and thus causes change in the capacitance value, and through detection on such change, the touch position is obtained. However, it is required a relatively large touch-pressing force to change the thickness of the screen, thus the capacitive type does not have high sensitivity. The operating principle of a photosensitive touch-screen is that: because a finger touch blocks the intensity of the light irradiated from the external to the photosensitive thin film transistor (TFT) and thus causes change in the inductive current of the photosensitive TFT, and through detection on such change, the touch position is obtained. However, due to finger shadow, light intensity changes are also caused in non-touched regions, the photosensitive elements therefore may be subjected to erroneous detection phenomenon due to the finger shadows, and also the photosension type does not have high accuracy.

SUMMARY

Embodiments of the disclosure provide an in-cell touch-screen liquid crystal display with a relatively high sensitivity and accuracy.

One aspect of the present disclosure provides a touch-screen liquid crystal display, comprising: an array substrate, a counter substrate provided opposite to the array substrate, spacers and liquid crystal between the array substrate and the counter substrate, an induction read-out circuit and a scanning circuit, wherein the counter substrate is provided thereon with an upper electrode plate, and the array substrate is provided thereon with a lower electrode plate; the upper electrode plate and the lower electrode plate form an induction capacitor; the array substrate comprises a touch unit provided within a pixel region; a drain electrode of a photosensitive TFT of the touch units is connected to the lower electrode plate, and the drain electrode of the photosensitive TFT is also connected to the scanning circuit; and an output-signal line of the touch unit is connected to the induction read-out circuit.

In the touch-screen liquid crystal display, for example, the spacers are post spacers.

In the touch-screen liquid crystal display, for example, the upper electrode plate is in the same shape as the spacers.

In the touch-screen liquid crystal display, for example, the photosensitive TFT is provided in a region, other than a display region and a black-matrix region, within the pixel region.

In the touch-screen liquid crystal display, for example, the touch unit comprises a BOOST capacitor, the photosensitive TFT and a resetting TFT; the BOOST capacitor is connected between the drain electrode and a source electrode of the photosensitive TFT; the source electrode and a gate electrode of the photosensitive TFT and a source electrode of the resetting TFT are all connected to the output-signal line of the touch unit; a drain electrode of the resetting TFT is connected to a charging-signal line; and a gate electrode of the resetting TFT is connected to a resetting-signal line.

In the touch-screen liquid crystal display, for example, the touch unit further comprises an induction coupling capacitor, and the induction coupling capacitor is connected between the scanning circuit and the drain electrode of the photosensitive TFT.

In the touch-screen liquid crystal display, for example, the charging-signal line and the output-signal line are parallel to a data line on the array substrate.

The touch-screen liquid crystal display in accordance with the embodiment of the present disclosure, by utilizing the combination of a touch technology and a BOOST technology, through the effect of a finger electric-field on a capacitor element during touch, makes a touch unit operate (during touch a BOOST capacitor do not work), and then, through the cooperation of the photosensitive TFT and the finger electric-field, produces sensing-signals; in the entire detection process, since it is not required a strong finger-touch, the problem of erroneous detection of a photosensitive element due to finger shadow can be avoided, so that the sensitivity and accuracy can be greatly enhanced.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, the technical terms or scientific terms used herein should be understood in a general sense, as understood by the ordinary skilled in the art of the present disclosure. The terms such as "a," "an," etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

Below, the touch-screen liquid crystal display proposed by the present disclosure will be described in detail in connection with the accompanying drawings and embodiments.

Figure 1:
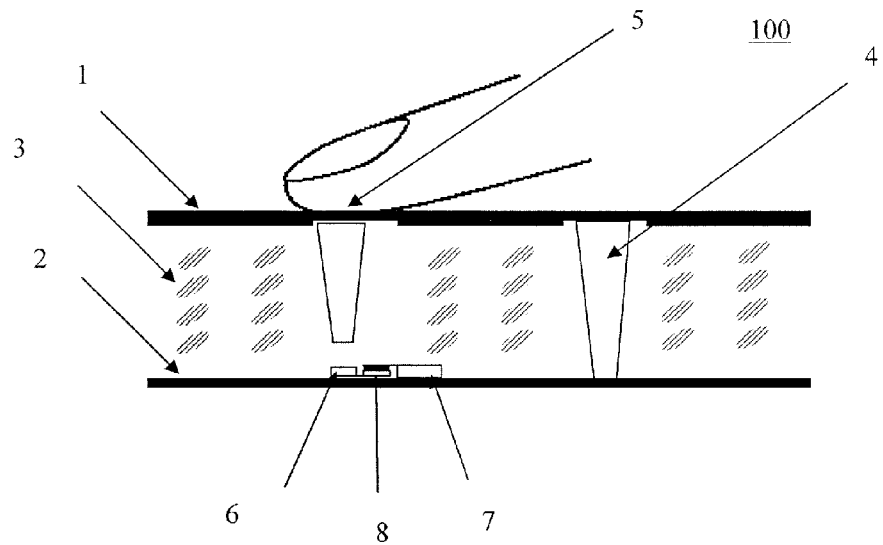
FIG. 1 is a schematic structural diagram of a touch-screen liquid crystal display in accordance with an embodiment of the present disclosure.

FIG. 1 shows a touch-screen liquid crystal display 100 in accordance with an embodiment of the present disclosure. The touch-screen display 100 comprises: a color-filter (CF) substrate 1, an array substrate 2 provided opposite to the CF substrate 1, a liquid crystal layer 3 and spacers 4 provided between the CF substrate 1 and the array substrate 2, a scanning circuit (not shown) and an induction read-out circuit 7. The CF substrate 1, as one example of a counter substrate provided opposite to the array substrate, comprises: a color-filter structure for implementing color display.

The liquid crystal display 100 may be various appropriate types of liquid crystal displays, including: a vertical electric-field type, such as a twisted nematic (TN) type, or a horizontal electric-field type, such as an in-plane switching (IPS) type, a fringe field switching (PFS) type and so on. The scope of the present disclosure is not limited thereto.

As shown in FIG. 1, CF substrate 1 is provided thereon with an upper electrode plate 5, and the upper electrode plate 5 is preferably formed by plating an electrically-conductive layer on the CF substrate 1; the array substrate 2 is provided thereon with a lower electrode plate 6, and the lower electrode plate 6 is preferably formed by plating an electrically-conductive layer on the array substrate 2. The upper electrode plate 5 and the lower electrode plate 6 are spaced apart from each other, thereby forming two electrode plates of an induction capacitor Ctouch.

On the array substrate 2, there are provided with a plurality of gate lines and a plurality of data lines, which are mutually perpendicular to each other, and these gate lines and data lines enclosing a plurality of pixel regions. For example, in each of the pixel regions, there is provided with a touch unit; alternatively, in more than two pixel regions, there is provided with one touch unit. Each of the pixel regions may comprise a thin film transistor as a switching element and a pixel electrode.

The touch unit is provided with a photosensitive TFT 8, for example, within the pixel region other than the display region or the black matrix (BM); for example, the drain electrode of the photosensitive TFT 8 is connected to the lower electrode plate of the induction capacitor Ctouch 6. and the drain electrode of the photosensitive TFT 8 is also connected to the scanning circuit. The scanning circuit is used to input scanning-signals to the touch unit, so that the position coordinates of a touch point can be located according to a touch voltage. The output-signal line of the touch unit is connected to the inductive readout circuit 7, so that the touch voltage is generated in accordance with change in the induction capacitor at the touch point, and then output to the induction read-out circuit 7.

The spacers 4 may be post spacers (PS) or spherical spacers, for controlling the spacing between the CF substrate 1 and the array substrate 2.

For example, the upper electrode plate 5 of the induction capacitor Ctouch may have a same shape as the post spacer 4 in horizontal cross-section, which is utilized to increase the sensitivity of the induction capacitor. In another example, the upper electrode plate 5 of the induction capacitor Ctouch may be formed by plating an electrically-conductive layer on the surface of the post spacer 4, and the electrically-conductive layer is connected with a corresponding detection circuit. When the upper electrode plate is pressed, the distance between the upper electrode plate 5 and the lower electrode plate 6 of the induction capacitor Ctouch is reduced; therefore, the charges stored in the induction capacitor Ctouch is varied.

A touch-screen liquid crystal display in accordance with another embodiment of the present disclosure comprises: an array substrate, a counter substrate, and a liquid crystal layer located between the array substrate and the counter substrate. The counter substrate does not comprise a color-filter structure, and accordingly, the array substrate comprises a color-filter structure; except for that, this embodiment is identical to the above-described embodiment.

Figure 2:
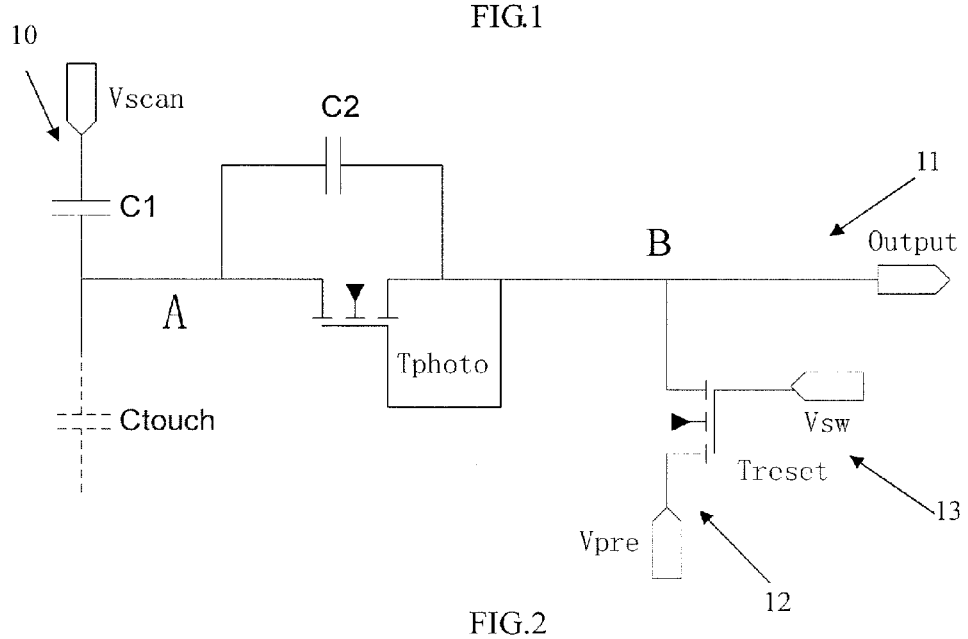
FIG. 2 is a schematic circuit diagram of a touch unit within a touch-screen liquid crystal display in accordance with an embodiment of the present disclosure.

FIG. 2 is a schematic circuit diagram of a touch unit within a touch-screen liquid crystal display in accordance with an embodiment of the present disclosure. As shown in FIG. 2, an example of a touch unit comprises: a BOOST capacitor C2, a photosensitive thin film transistor (TFT) Tphoto, and a resetting TFT Treset. The capacitor C2 is connected between the drain electrode and the source electrode of the TFT Tphoto; the source electrode and the gate electrode of the TFT Tphoto as well as the source electrode of the TFT Treset are all connected to an output-signal line 11 of the touch unit; the drain electrode of the TFT Treset is connected to a charging-signal line 12; and the gate electrode of the TFT Treset is connected to a resetting-signal line 13. The BOOST technology mentioned in this embodiment is similar to a charges-pump structure, in which when the electrode voltage at one end of a capacitor (e.g., the capacitor C2 in this example) is suddenly increased, the electrode voltage at the other end of the capacitor will follow the trend to increase.

The touch unit further comprises an induction coupling capacitor C1, which is connected between a scanning-signal line 10 and the drain electrode of the TFT Tphoto, while the scanning signal line 10 is connected to the scanning circuit. Also, one of the two electrode plates of the induction capacitor Ctouch is electrically connected to the drain electrode of the TFT Tphoto, while other electrode plate is grounded or dangled. As illustrated in the drawing, the electrode plates of the induction capacitor Ctouch and the electrode plates of the induction coupling capacitor C1 are both connected, via a node A, to the drain electrode of the TFT Tphoto and to one of the electrode plates of the BOOST capacitor C2, respectively.

The other electrode plate of the BOOST capacitor and the source electrode of the TFT Tphoto are connected, via a node B, to an output terminal and to the source electrode of the TFT Treset.

The charging-signal line 12 and the output-signal line 11 may be, for example, in parallel with the data lines on the array substrate 1.

Figure 3:
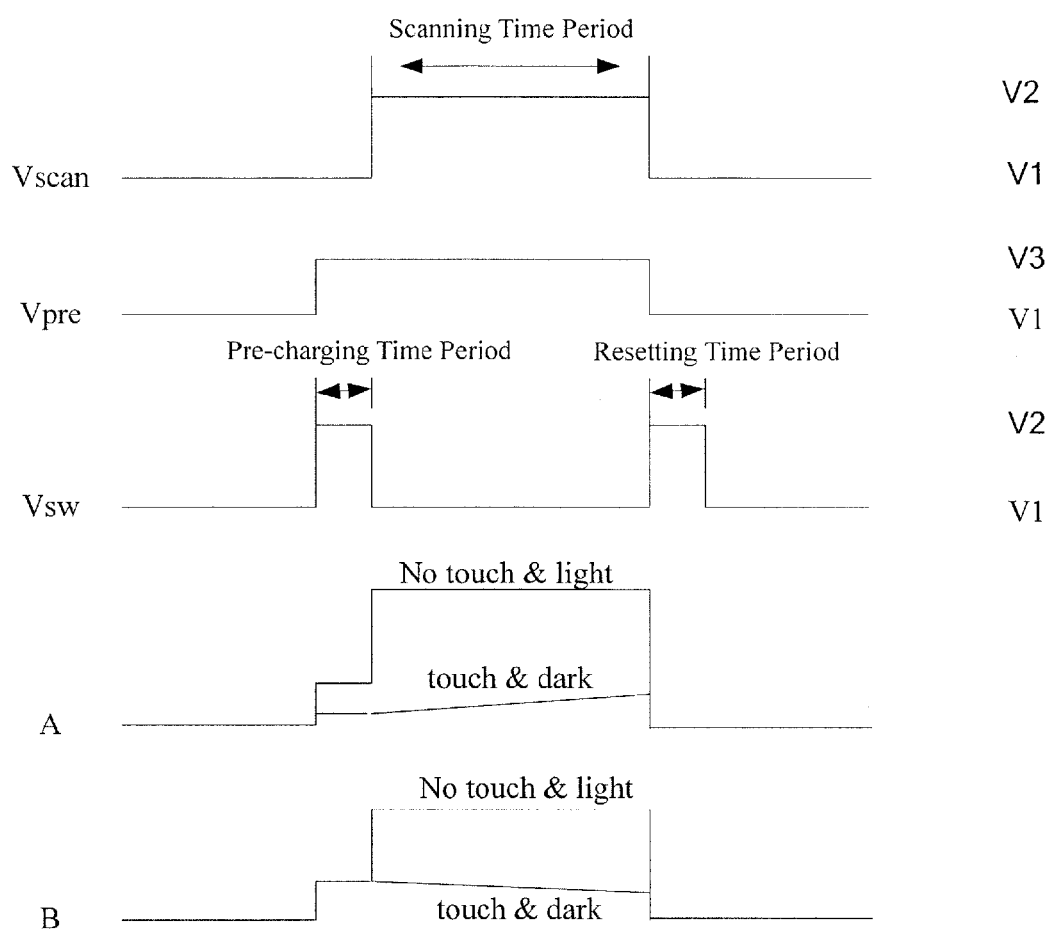
FIG. 3 is a functional waveform diagram of a touch unit within a touch-screen liquid crystal display in accordance with an embodiment of the present disclosure.

As shown in FIG. 3, the operation of the touch unit is controlled by three groups of signal voltages, and V2>V3>V1. In combination with FIG. 2 and FIG. 3, the operating process of the touch unit is described as follows.

1. During pre-charging time period, the resetting-voltage Vsw input from the resetting-signal line 13 and the charging-voltage Vpre input from the charging-signal line 12 are changed from V1 to V2 and V3, respectively, and the voltage of the node B is changed to V2; therefore, TFT Treset is turned on, and the voltage of the node A is charged to V2 (if now there is a touch, due to light-blocking and the effect of a human body electric-field, the charging rate of the TFT Tphoto is decreased, and the voltage of node A is less than the voltage value in case of light irradiation).

2. During scanning time period, the induction read-out circuit detects the output-signal line 11, and at the same time, the resetting-voltage Vsw becomes V1, and the TFT Treset is turned off. The scanning-voltage Vscan input from the scanning-signal line 10 is changed from V1 to V2, the TFT Tphoto is in reverse cut-off, and the node B is coupled to a high voltage, and this stage is a voltage-boosting process in the BOOST technology (if now there is a touch, due to the effect of the human body electric-field, the voltage of the node A is pulled downward, and at the same time the Tphoto remains the state of being turned on, thus the voltage of the node B will not be coupled to a high voltage).

3. During resetting time period, the charging-voltage Vpre becomes a ground voltage, and the resetting-voltage Vsw causes the TFT Treset to be turned on, so that the Node B is discharged.

The functional waveform diagram of the above-described operating process is as shown in FIG. 3.

The above description is only the preferred implementations of the present disclosure, but not limitative to the scope of the present disclosure. The scope of the present disclosure should be defined by the appended claims.

The invention clamed is:

1. A touch-screen liquid crystal display, comprising: an array substrate, a counter substrate provided opposite to the array substrate, liquid crystal between the array substrate and the counter substrate, an induction read-out circuit and a scanning circuit,
   wherein the counter substrate is provided thereon with an upper electrode plate, and the array substrate is provided thereon with a lower electrode plate; the upper electrode plate and the lower electrode plate form a first capacitor for induction; the array substrate comprises a touch unit provided within a pixel region, and
   the touch unit comprises a second capacitor, a photosensitive thin film transistor (TFT) and a resetting TFT;
   wherein the drain electrode of the photosensitive TFT is connected to the lower electrode plate, and the drain electrode of the photosensitive TFT is also connected to the scanning circuit; and an output-signal line of the touch unit is connected to the read-out circuit, and
   wherein the second capacitor is connected between the drain electrode and a source electrode of the photosensitive TFT; the source electrode and a gate electrode of the photosensitive TFT and a source electrode of the resetting TFT are all electrically connected to the output-signal line of the touch unit; a drain electrode of the resetting TFT is connected to a charging-signal line; and a gate electrode of the resetting TFT is connected to a resetting-signal line.

2. The touch-screen liquid crystal display according to claim 1, wherein spacers are provided between the counter substrate and the array substrate.

3. The touch-screen liquid crystal display according to claim 2, wherein the spacers are post spacers, and the upper electrode plate is in the same shape as the spacers.

4. The touch-screen liquid crystal display according to claim 1, wherein the photosensitive TFT is provided in a region, other than a display region and a black-matrix region, within the pixel region.

5. The touch-screen liquid crystal display according to claim 1, wherein the touch unit further comprises a coupling capacitor, and the induction coupling capacitor is connected between the scanning circuit and the drain electrode of the photosensitive TFT.

6. The touch-screen liquid crystal display according to claim 1, wherein the charging-signal line and the output-signal line are parallel to a data line on the array substrate.

7. The touch-screen liquid crystal display according to claim 1, wherein the counter substrate is a color-filter substrate.

8. The touch-screen liquid crystal display according to claim 1, wherein one touch unit is provided for two or more pixel regions.

* * * * *